(12) United States Patent
Lin

(10) Patent No.: US 7,088,337 B2
(45) Date of Patent: Aug. 8, 2006

(54) INPUT DEVICE FOR ALARMING EXCESSIVE STRIKING FORCE

(75) Inventor: Hsien-Ming Lin, Taipei (TW)

(73) Assignee: Lite-on Technology Corporation, Taipei (TW)

( * ) Notice: Subject to any disclaimer, the term of this patent is extended or adjusted under 35 U.S.C. 154(b) by 334 days.

(21) Appl. No.: 10/443,013

(22) Filed: May 22, 2003

(65) Prior Publication Data

US 2004/0095319 A1 May 20, 2004

(30) Foreign Application Priority Data

Nov. 15, 2002 (TW) ............................... 91218406 U

(51) Int. Cl.
*G09G 5/08* (2006.01)

(52) U.S. Cl. ...................... 345/161; 345/169; 345/172

(58) Field of Classification Search ........ 345/168–169, 345/172–173; 200/510, 1 B, 5 A, 406; 702/41
See application file for complete search history.

(56) References Cited

U.S. PATENT DOCUMENTS

| 5,579,238 A | * | 11/1996 | Krugman ...................... 702/41 |
| 5,745,376 A | * | 4/1998 | Barker et al. .................. 702/41 |
| 5,902,257 A | * | 5/1999 | Korth .......................... 601/123 |
| 6,369,803 B1 | * | 4/2002 | Brisebois et al. ............ 345/173 |
| 6,400,285 B1 | * | 6/2002 | Gifford ......................... 341/22 |
| 6,498,312 B1 | * | 12/2002 | Villain ......................... 200/510 |
| 2001/0013463 A1 | * | 8/2001 | Asai et al. ................... 200/1 B |

* cited by examiner

*Primary Examiner*—Richard Hjerpe
*Assistant Examiner*—Jean Lesperance
(74) *Attorney, Agent, or Firm*—Birch, Stewart, Kolasch & Birch, LLP

(57) ABSTRACT

An input device for alarming excessive striking force adopted for use on electronic instruments alerts users when the button keys are being depressed with excessive force, and preventing hand injury. The invention includes a button key structure, a first conductor membrane, a spacing membrane, a second conductor membrane and an alarm. When the button key structure is subject to an excessive external force, the button key structure connects electronically to a first conductor to output signals, and the first conductor also runs through an opening to connect electronically to a second conductor to output signals to the alarm to alert the presence of the excessive force.

12 Claims, 4 Drawing Sheets

INPUT DEVICE FOR ALARMING EXCESSIVE STRIKING FORCE

FIELD OF THE INVENTION

The invention relates to an input device for electronic instruments, particularly for personal computer keyboards, notebook computer keyboards, personal digital assistant keypads, handset keypads or the like for alarming excessive striking force.

BACKGROUND OF THE INVENTION

In recent years the volume of information has grown rapidly. Utilization of electronic instruments has also increased significantly. As a result, personal computers, notebook computers, PDAs, and handsets are frequently used by the general public in their daily lives. For entering data into electronic instruments, keyboards or keypads are the most convenient input devices.

However, using a keyboard often causes physical injury. Therefore, these days many keyboards are more ergonomically designed. Still, there are many problems when users strike the button keys during operation. For instance, depending on the user's mood and physical conditions, the depressing force on the button keys of the keyboard could be too small or too large. If the depressing force is too small data cannot be input as desired. If the depressing force is too strong for a prolonged period of time, finger muscles are stressed and may be injured.

Therefore, it is necessary to alert people when the striking force on the button keys is excessive so that they can change the depressing force on the button keys to prevent muscle injury.

SUMMARY OF THE INVENTION

The primary object of the invention is to provide an input device for alarming excessive striking force when users depress the button keys so that they can change the depressing force on the button keys and prevent hand injury.

The input device for alarming excessive striking force according to the invention is for entering information into electronic instruments. The input devices may be keyboards of personal computers, keyboards of notebook computers, keypads of personal digital assistants, keypads of handsets or the like.

The input device for alarming excessive striking force according to the invention includes a button key structure, a first conductor membrane, a spacing membrane, a second conductor membrane and an alarm.

The button key structure includes a key top, an elastic member and a key seat. The key top is to absorb the user's depressing force. The elastic member corresponds to the key top and the first conductor membrane and has an actuating conductor. The key seat has an upper housing chamber and a lower housing chamber. The upper housing chamber houses the key top and the elastic member, and allows the key top to move only towards the elastic member when subject to external force. The lower housing chamber provides a space to accommodate the first conductor membrane, the spacing membrane, the second conductor membrane and the alarm.

The first conductor membrane is located below the button key structure and has a first conductor. The first conductor corresponds to the actuating conductor of the button key structure. The spacing membrane is located below the first conductor membrane and has an opening corresponding to the first conductor. The second conductor membrane is located below the spacing membrane and has a second conductor corresponding to the opening. The alarm connects electronically to the second conductor membrane, and may be an audio alarm, a lighting alarm (such as light emitting diodes), a display screen, or the combination of the three. It provides alarm through audio signals, light signals or message displaying on the screen.

When in use, a force is applied on the key top of the button key structure. The key top is moved towards the elastic member due to the restriction of the upper housing chamber of the key seat. The elastic member in turn moves towards the first conductor membrane and is deformed, and drives the actuating conductor to contact the first conductor and establish electronic connection. Depending on the force, the actuating conductor may be in contact with the first conductor to output signals, or if the force is excessive, in addition to making the actuating conductor contact the first conductor and output signals, the first conductor membrane is also moved towards the spacing membrane and deformed. As a result, the first conductor passes through the opening to contact the second conductor and establish electronic connection. Hence while the actuating conductor contacts the first conductor and outputs the desired signals resulting from ordinary pressure on the button keys, the first conductor and the second conductor also have electric connection and output alarm signals to alert the condition of excessive force.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
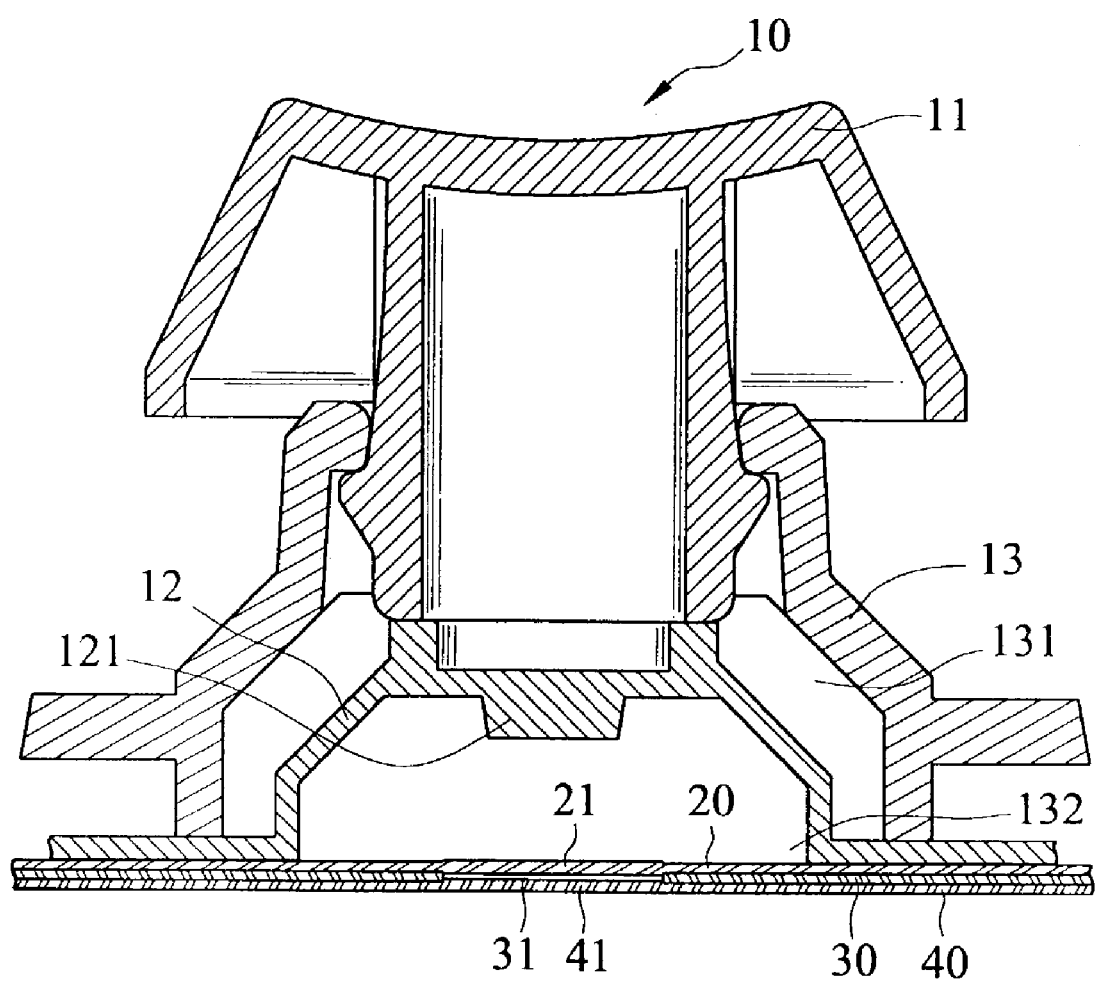
FIG. 1 is a sectional view of a first embodiment of the invention.
Figure 2:
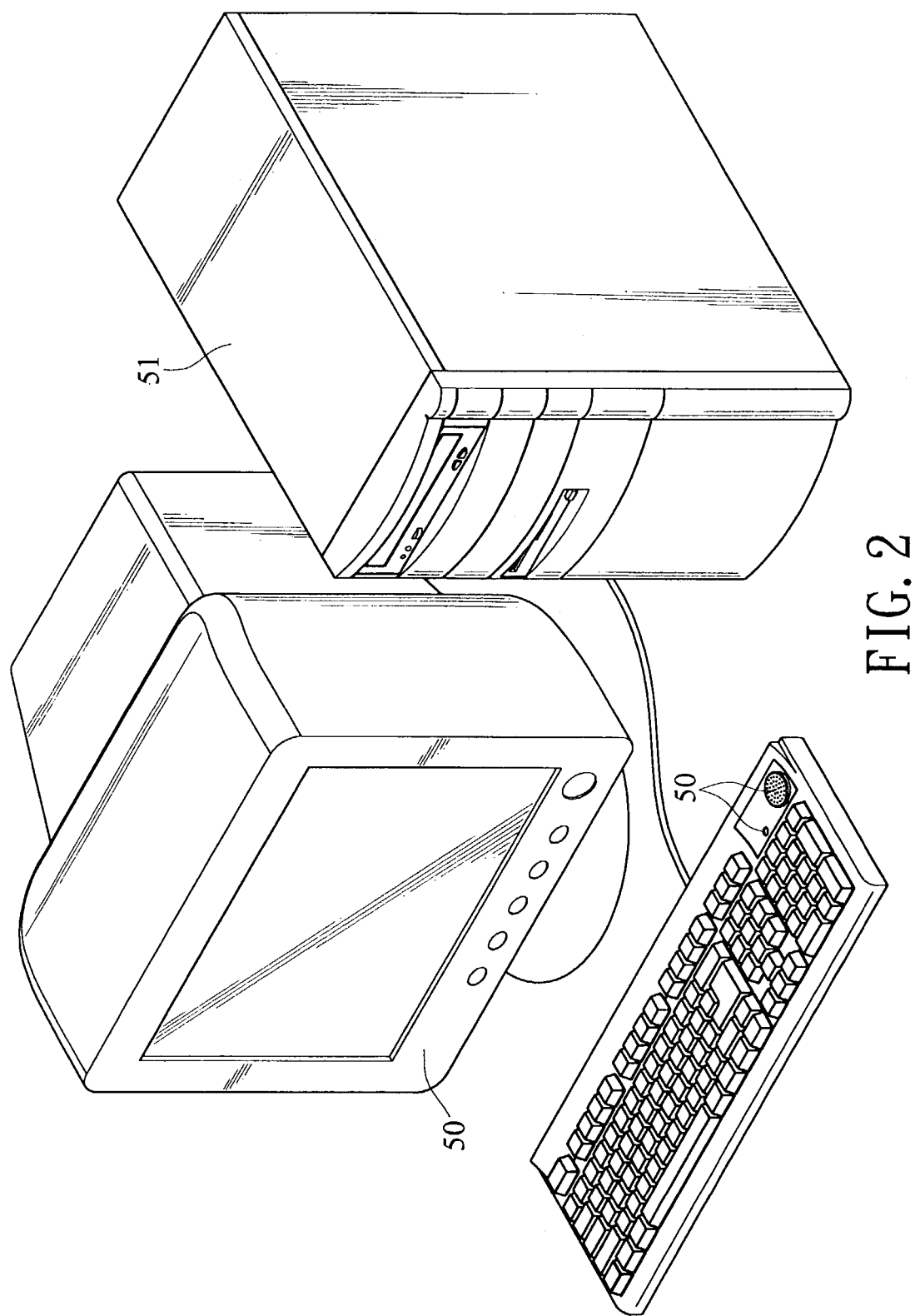
FIG. 2 is a schematic view of the alarm of the invention.

The invention aims to provide an input device for electronic instruments. The input device may be a personal computer keyboard, notebook computer keyboard, personal digital assistant keypad, handset keypad or the like. Refer to FIGS. 1 and 2 for a first embodiment of the invention. It includes a button key structure 10, a first conductor membrane 20, a spacing membrane 30, a second conductor membrane 40 and an alarm 50.

The button key structure 10 includes a key top 11, an elastic member 12 and a key seat 13. The key top 11 is for absorbing the depressing force of users. The elastic member 12 corresponds to the key top 11 and the first conductor membrane 20, and includes an actuating conductor 121. The key seat 13 has an upper housing chamber 131 and a lower housing chamber 132. The upper housing chamber 131 is to accommodate the key top 11 and the elastic member 12, and allow the key top 11 to move only towards the elastic member 12 when subject to external force. The lower housing chamber 132 is to accommodate the first conductor membrane 20, the spacing membrane 30 and the second conductor membrane 40.

The first conductor membrane 20 is located below the button key structure 10 and has a first conductor 21. The first conductor 21 corresponds to the actuating conductor 121 of the button key structure 10. The spacing membrane 30 is located below the first conductor membrane 20 and has an opening 31 corresponding to the first conductor 21. The second conductor membrane 40 is located below the spacing membrane 30 and has a second conductor 41. The second conductor 41 corresponds to the opening 31. The alarm 50 connects electronically to the second conductor membrane 40. The alarm may be an audio alarm, a lighting alarm (such as light emitting diodes), a display screen, or the combination of the three. It provides alarm through audio signals, light signals or a message displayed on the screen. For the alarm indicated by displaying messages on the screen, a driving program must be installed in a computer processor 51 to perform the necessary processes.

Referring to FIGS. 1, 2, 3A and 3B, when in use, apply force to the key top 11 of the button key structure 10 to move towards the elastic member 12 in the upper housing chamber 131 of the key seat 13. The elastic member 12 is deformed in the direction of the first conductor membrane 20 and drives the actuating conductor 121 to establish electronic connection with the first conductor 21. Depending on the force being applied, the actuating conductor 121 and the first conductor 21 may be connected electronically to output signals, or if the force is excessively strong, in addition to the electronic connection between the actuating conductor 121 and the first conductor 21 and the output of signals, the first conductor membrane 20 is also deformed in the direction of the spacing membrane 30, and the first conductor 21 runs through the opening 31 to establish electronic connection with the second conductor 41. The second conductor 41 outputs signals to the alarm 50 to alert excessive force. Hence when the actuating conductor 121 and the first conductor 21 have electronic connection, desired signals resulting from ordinary pressure on the button keys are output. When the first conductor 21 and the second conductor 41 are connected electronically, a signal of excessive force is output to the alarm 50 to alert the presence of excessive force.

Figure 4:
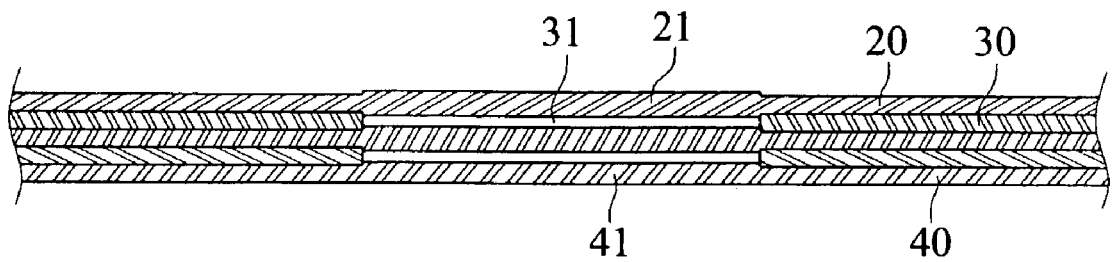
FIG. 4 is a sectional view of a second embodiment of the invention.

It is also possible to segment the excessive force by degree and generate different alarms as a second embodiment shown in FIG. 4. The numbers of the first conductor membrane 20, spacing membrane 30 and alarm 50 are doubled. When the actuating conductor 121 and the first conductor 21 on the upper side have electronic connection, desired signals resulting from ordinary pressure on the button keys are output. When the first conductor membrane 20 at the upper side is deformed toward the first conductor membrane 20 at the lower side, the first conductor 21 at the upper side runs through the opening 31 and connects electronically to the first conductor 21 at the lower side, and a first signal of excessive force is output to the alarm 50 (such as lighting indication). When the lower first conductor membrane 20 is deformed towards the second conductor membrane 40, and the lower first conductor 21 runs through the opening 31 to connect electronically to the second conductor 41, a second signal of excessive force is output to the alarm 50 (such as an audio alarm). Thus different excessive forces can generate two different alarms.

Figure 5:
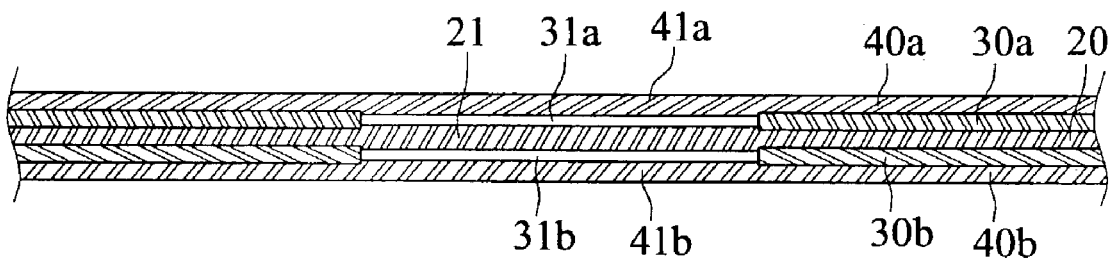
FIG. 5 is a sectional view of a third embodiment of the invention.

Similarly, a third embodiment of the input device for alarming excessive striking force according to the invention may be adopted for entering information into electronic instruments. The input devices may be personal computer keyboards, notebook computer keyboards, personal digital assistant keypads, handset keypads or the like. As shown in FIGS. 2 and 5, it includes a button key structure 10, a first conductor membrane 20, spacing membranes 30a and 30b, second conductor membranes 40a and 40b, and an alarm 50.

The button key structure 10 includes a key top 11, an elastic member 12 and a key seat 13. The key top 11 is for receiving the depressing force of users. The elastic member 12 corresponds to the key top 11 and the first conductor membrane 20, and includes an actuating conductor 121. The key seat 13 has an upper housing chamber 131 and a lower housing chamber 132. The upper housing chamber 131 is to accommodate the key top 11 and the elastic member 12, and to allow the key top 11 to move only towards the elastic member 12 when subject to external force. The lower housing chamber 132 is to accommodate the first conductor membrane 20, the spacing membranes 30a and 30b, the second conductor membranes 40a and 40b, and the alarm 50.

The second conductor membrane 40a is located below the button key structure 10 and has a second conductor 41a. The second conductor 41a corresponds to the actuating conductor 121. The spacing membrane 30a is located below the second conductor membrane 40a and has an opening 31 corresponding to the second conductor 41a. The first conductor membrane 20 is located below the spacing membrane 30a and has a first conductor 21. The first conductor 21 corresponds to the opening 31a. The spacing membrane 30b is located below the first conductor membrane 20a and has an opening 31b corresponding to the first conductor 21. The second conductor membrane 40b is located below the spacing membrane 30b and has a second conductor 41b corresponding to the opening 31b. The alarm 50 is connected electronically to the second conductor membrane 40. The alarm may be an audio alarm, a lighting alarm (such as light emitting diodes) a display screen, or the combination of the three. It provides alarm through audio signals, light signals or a message displaying on the screen. For the alarm indicated by displaying messages on the screen, a driving program must be installed in a computer processor 51 to perform the necessary processes.

Figure 3A:
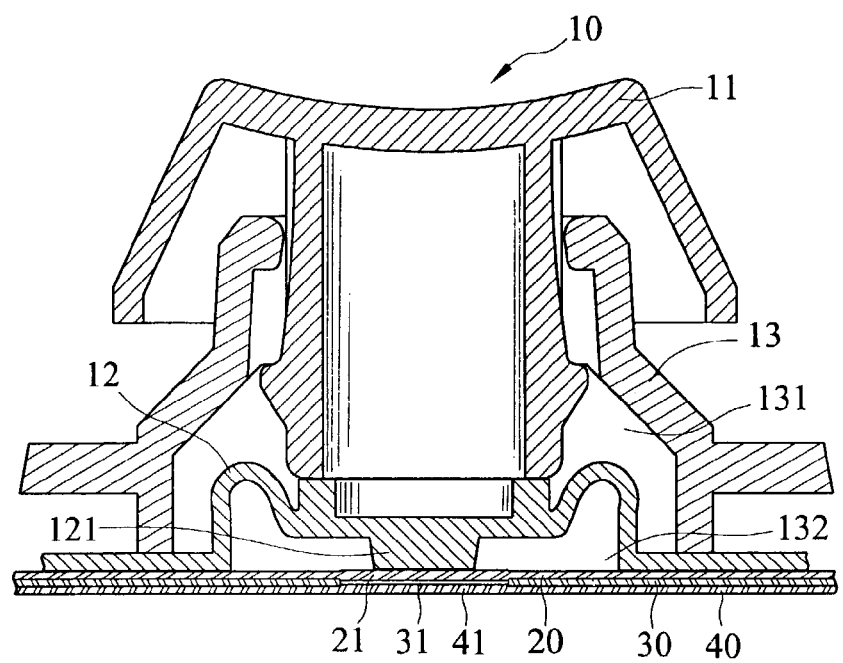
FIGS. 3A and 3B are schematic views of the first embodiment of the invention in operation.
Figure 3B:
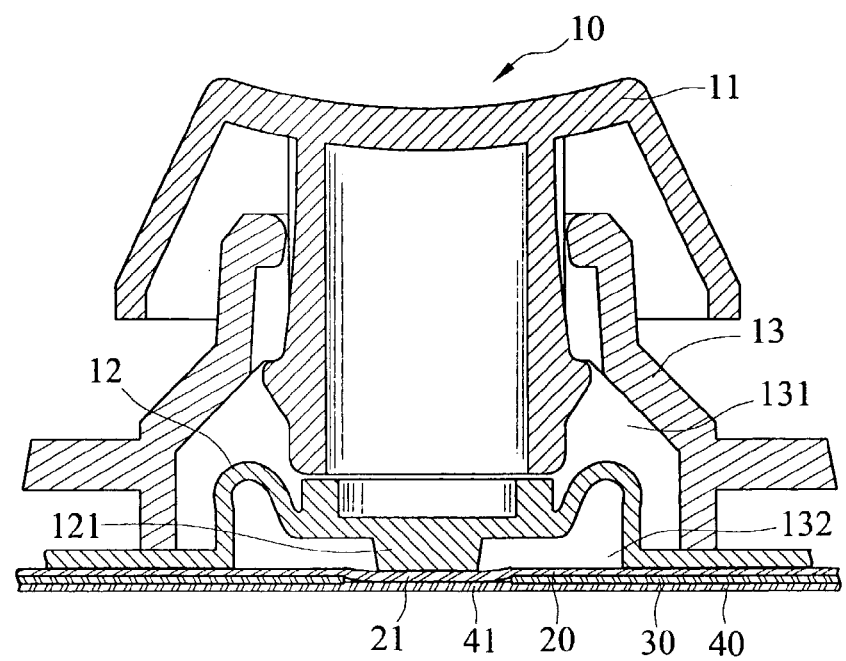

Referring to FIGS. 3A, 3B and 5, when in use, apply a force to the key top 11 of the button key structure 10 to move towards the elastic member 12 in the upper housing chamber 131 of the key seat 13. The elastic member 12 is deformed in the direction of the second conductor membrane 40a and drives the actuating conductor 121 to compress the second conductor membrane 40a. The second conductor 41a runs through the opening 31a to establish electronic connection with the first conductor 21. Depending on the force being applied, the second conductor 41a and the first conductor 21 may be connected electronically to output signals, or if the force is excessive, in addition to the electronic connection between the second conductor 41a and the first conductor 21 and the output of signals, the first conductor membrane 20 is further deformed in the direction of the spacing membrane 30b, and the first conductor 21 runs through the opening 31b to establish electronic connection with the second conductor 41b. The second conductor 41b outputs signals to the alarm 50 to alert excessive force. Hence when the second conductor 41 and the first conductor 21 have electronic connection, desired signals resulting from ordinary pressure on the button keys are output. When the first conductor 21 and the second conductor 41b are connected electronically, a signal of excessive force is output to the alarm 50 to alert the presence of excessive force.

Figure 6:
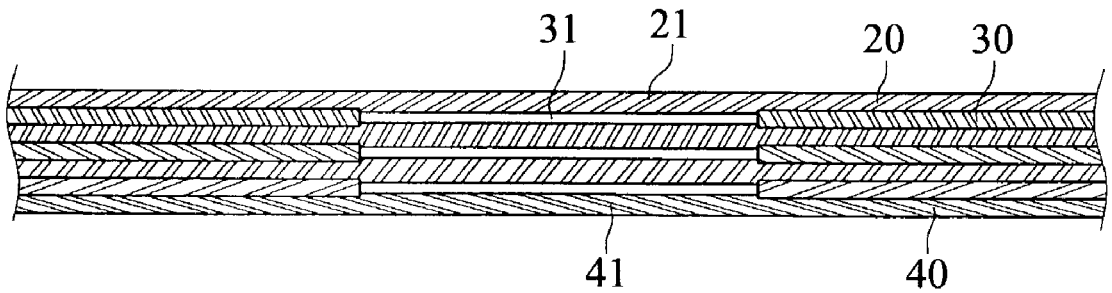
FIG. 6 is a sectional view of a fourth embodiment of the invention.

It is also possible to segment the excessive force by degree and generate different alarms as a fourth embodiment shown in FIG. 6. The numbers of the first conductor membrane 20, spacing membrane 30a and alarm 50 are doubled. When the second conductor 41a and the first conductor 21 on the upper side have electronic connection, desired signals resulting from ordinary pressure on the button keys are output. When the first conductor membrane 20 at the upper side is deformed towards the first conductor membrane 20 at the lower side, the first conductor 21 at the upper side runs through the opening 31a and connects electronically to the first conductor 21 at the lower side, and a first signal of excessive force is output to the alarm 50 (such as lighting indication). When the lower first conductor membrane 20 is deformed towards the second conductor membrane 40b, and the lower first conductor 21 runs through the opening 31 to connect electronically to the second conductor 41b, a second signal of excessive force is output to the alarm 50 (such as an audio alarm). Thus different excessive forces can generate two different alarms.

By means of the construction set forth above, when the input device for alarming excessive striking force of the invention receives excessive depressing force on the button key, it generates an alarm to alert the user so that the user may alter his/her striking force and prevent hand injury.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An input device for alarming excessive striking force, comprising:
    a button key structure;
    at least one first conductor membrane including a first conductor corresponding to the button key structure;
    at least one spacing membrane located on a side of said first conductor membrane opposite said button key structure having an opening corresponding to the first conductor;
    a second conductor membrane located on a side of said spacing membrane opposite said first conductor membrane having a second conductor corresponding to the opening; and
    at least one alarm connecting electronically to the second conductor membrane such that when the button key structure is subject to an excessive external force, the button key structure connects electronically to the first conductor to output signals, and the first conductor runs through the opening to connect electronically to the second conductor to output signals to the alarm to alert the presence of the excessive force.

2. The input device for alarming excessive striking force of claim 1 further including:
    a key top; and
    an elastic member corresponding to the key top and the first conductor membrane, the elastic member having an actuating conductor corresponding to the first conductor so that when the key top is subject to an external force, the elastic member is deformed to drive the actuating member to connect electronically to the first conductor.

3. The input device for alarming excessive striking force of claim 2, wherein the button key structure further includes:
    a key seat which has an upper housing chamber and a lower housing chamber, the upper housing chamber accommodating the key top and the elastic member and allowing the key top to move only towards the elastic member when subject to an external force, the lower housing chamber accommodating the first conductor membrane, the spacing membrane, the second conductor membrane and the alarm.

4. The input device for alarming excessive striking force of claim 1 further including:
    an another spacing membrane which has an another opening corresponding to the first conductor; and
    an another second conductor membrane which has an another second conductor corresponding to the another opening and the button key structure such that when the button key structure is subject to an excessive external force, the button key structure drives the another second conductor to run through the another opening to connect electronically to the first conductor to output signals, and the first conductor runs through the opening to connect electronically to the second conductor to output signals to the alarm to alert the presence of the excessive force.

5. The input device for alarming excessive striking force of claim 4, wherein the button key structure further includes:
    a key top; and
    an elastic member corresponding to the key top and the first conductor membrane, the elastic member having an actuating conductor corresponding to the first conductor so that when the key top is subject to an external force the elastic member is deformed to drive the actuating member to connect electronically to the first conductor.

6. The input device for alarming excessive striking force of claim 5, wherein the button key structure further includes:
    a key seat which has an upper housing chamber and a lower housing chamber, the upper housing chamber accommodating the key top and the elastic member and allowing the key top to move only towards the elastic member when subject to an external force, the lower housing chamber accommodating the another spacing membrane, the another second conductor membrane, the first conductor membrane, the spacing membrane, the second conductor membrane and the alarm.

7. The input device for alarming excessive striking force of claim 1, wherein the alarm is an audio alarm.

8. The input device for alarming excessive striking force of claim 1, wherein the alarm is a lighting alarm.

9. The input device for alarming excessive striking force of claim 8, wherein the alarm is a light emitting diode.

10. The input device fdr alarming excessive striking force of claim 1, wherein the alarm is a display screen.

11. The input device for alarming excessive striking force of claim 1, wherein when the number of the first conductor membrane and the spacing membrane is equal and more than one, and the number of the alarm is greater than that of the first conductor membrane by one, one of the alarms connects electronically to the second conductor membrane and other alarms connect respectively and electronically to each of the first conductor membranes.

12. The input device for alarming excessive striking force of claim 1, wherein said first conductor membrane, said spacing membrane and said second conductor membrane are planar and parallel to each other.

* * * * *